United States Patent [19]

Schmidt

[11] Patent Number: 4,552,387

[45] Date of Patent: Nov. 12, 1985

[54] COUPLING FOR PRESSURE HOSE

[76] Inventor: Gerhard S. E. Schmidt, 208 Duplex Ave., Toronto, Ontario, Canada, M5P 2B2

[21] Appl. No.: 497,074

[22] Filed: May 23, 1983

Related U.S. Application Data

[63] Continuation-in-part of Ser. No. 367,782, Apr. 12, 1982, abandoned.

[51] Int. Cl.[4] .............................................. F16L 33/00
[52] U.S. Cl. .................................... 285/238; 285/190; 285/257; 285/243; 285/272; 285/319; 285/322
[58] Field of Search ............... 285/238, 248, 249, 255, 285/322, 323, 257, 319, 272, 275, 243, 190

[56] References Cited

U.S. PATENT DOCUMENTS

| | | | |
|---|---|---|---|
| 2,179,930 | 11/1939 | Harrington | 285/243 |
| 3,325,194 | 6/1967 | Grawley | 285/322 X |
| 3,375,026 | 3/1968 | Szomatzky | 285/322 |
| 3,967,838 | 7/1976 | Legris | 285/323 X |
| 4,103,941 | 8/1978 | Stoll | 285/322 X |
| 4,225,162 | 9/1980 | Dola | 285/242 X |
| 4,288,112 | 9/1981 | Stoll | 285/322 X |
| 4,328,979 | 5/1982 | Stoll | 285/243 X |

FOREIGN PATENT DOCUMENTS 597215 1/1948 United Kingdom ................ 285/243

Primary Examiner—Richard J. Scanlan, Jr.
Attorney, Agent, or Firm—George A. Rolston

[57] ABSTRACT

A hose coupling having a threaded body and hose clamping fingers extending from the body, the body and the fingers being formed as a one piece unit in a single manufacturing operation the fingers being formed with a ridge around the exterior, and a separate slideable collar fitting around the fingers, and slideable along the finger so as to squeeze the fingers together when the collar is pressed towards the body, and releasing the fingers when the collar is pulled away from the body, the fingers having interior teeth, arranged to engage the surface of a hose, and bite into it when the fingers are squeezed together by the collar and at the transition between the fingers and the body, an interior sealing sleeve, of gradually reducing diameter, for making sealing engagement with the outer surface of the hose, when the hose is forced into the sleeve.

11 Claims, 8 Drawing Figures

COUPLING FOR PRESSURE HOSE

This application is a continuation in part of U.S. patent application Ser. No. 367,782 filed Apr. 12, 1982, now abandoned, entitled "Coupling for Pressure Hose".

The invention relates to a coupling for a pressure hose, and is of particular significance in connection with pressure hoses used in the assembly of fluid control systems in which machinery or process controls are actuated by fluid pressure.

BACKGROUND OF THE INVENTION

Typically couplings according to the invention are used in pressure systems where the pressure hose is carrying pneumatic fluidic or hydraulic pressure for controlling various devices. In such systems a large number of different pressure hoses are provided, connecting different process or equipment controllers, valves, relays and the like, with a source of pressure. Usually such systems are assembled by hand, and the hose is cut to length as desired. The valves, controllers and the like are formed with one or more female threaded bores, and male threaded screw-in couplings are fastened therein. The lengths of hose are then secured to the screw-in couplings by means of which they are thus connected to the valves, controllers and other members. In the past, there have been numerous designs of such couplings. Generally speaking, they must meet three general requirements. They must be simple and easy to assemble by hand. They must provide a good pneumatic or hydraulic seal, within the ranges of pressure for which the system is intended. They must be cheap to manufacture and sell, since they will be used in large numbers.

Generally speaking, however, the prior art couplings have been of relatively complex multi-part construction, inevitably leading to a relatively costly assembly. In addition, the multi-part construction of such earlier couplings has introduced problems in providing a good seal.

In such couplings, it is particularly desireable to provide a screw threaded body portion, which may for instance be screw threaded into the particular recess to which the hose is to be connected, and the hose itself being then introduced into the body portion, and fastened and sealed without the use of further threaded fasteners. It is somewhat disadvantageous if a second threaded fastener is used, since the tightening down of such a further threaded fastener may cause the hose to twist, or may in some cases damage the hose or coupling as a result of over tightening and is for these reasons undesirable.

In order to overcome this problem, it has been proposed to provide a hose coupling of this type, having a linear hose clamping or fastening action. Such a coupling consisted of a threaded metallic body, and a plastic sleeve having a plurality of fingers extending around the hose. A sliding collar was provided around the exterior of such fingers with a wedging action so that when the collar was drawn along the sleeve away from the threaded body, it squeezed the fingers tightly together against the hose. When it is pushed in the opposite direction towards the threaded body, it released the fingers allowing the hose to be removed. In this system, the arrangement of the sleeve and fingers was manufactured separately from the threaded body, and was held in position in the threaded body in a relatively flimsy unsatisfactory manner, and required the use of a separate O-ring to provide a pneumatic seal.

The fingers were held in place in a recess in the metal body by a simple friction or push fit. Often the parts became disassembled in shipping or storage. Once assembled with the hoses, however, any movement of the hose, particularly a bending movement close to the coupling, was likely to separate the fingers from the metal body. In addition, since this unit was a multi-part construction, the manufacturing cost was relatively high.

BRIEF SUMMARY OF THE INVENTION

The invention comprises the provision of a hose coupling having a threaded body portion, and hose clamping fingers extending from the threaded body portion, the body portion and the fingers being formed as a single integral one piece unit, in a single manufacturing operation, the fingers being formed with an annular ridge around the exterior, and there being a separate slideable collar fitting captively around the fingers, and being slideable along the fingers relative to the annular ridge, so as to squeeze the fingers together, when the collar is pressed towards the threaded body portion, and releasing the fingers, when the collar is pulled away from the threaded body portion and the fingers having interior elongated tooth members, arranged and located so as to engage the outer surface of the hose, and bite into it when the fingers are squeezed together, and, there being at the transition between said fingers and said threaded body, an interior sealing sleeve of gradually reducing diameter, for making sealing engagement with the outer surface of the hose when the hose is forced into the sleeve.

There is a collar retaining ring on the collar which has an angled inner surface to make it easier to force the collar over the ridge and the fingers in the initial assembly operation.

In a particularly preferred form of the invention, the hose engaging teeth are formed in a diagonal manner extending along the axis of the fingers, somewhat in the manner of coarsely pitched threads thereby to provide an elongated hose clamping surface.

In a further specific form of the invention, the threaded body portion is provided with a tapered male threaded end, for seating in a tapered female threaded bore, the taper of the nail threaded portion on the threaded body having a wider angle than the taper of the threads in the female threaded bore whereby to provide an effective seal when the same are threaded together.

A further and related objective of the invention is to provide a rotatable Tee junction, having a hose coupling embodying the invention which includes a hose connection portion, and a rotatable body received in such hose connection portion, and a head on such rotatable body by means of which it may be engaged and threadedly engaged in another fitting.

In another form of the invention, the fingers are provided with an additional annular recess, and the collar is provided with a mating annular ridge, so that once the hose is clamped between the fingers, the collar is retained by engagement of the rib in the recess.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
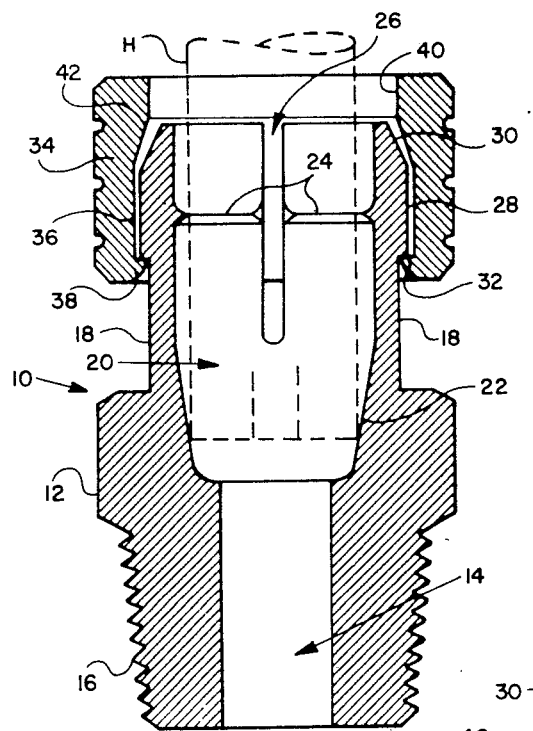
FIG. 1 is a longitudinal section of a hose coupling according to the invention.

Referring now to FIG. 1, the hose coupling is shown generally by the reference numeral 10, and a portion of hose shown in phantom as H is shown inserted therein. The coupling 10 will be seen to comprise a main body portion 12, defining a central axial bore 14, and having a male threaded portion 16 thereon. As shown in FIG. 1, the male threaded portion is tapered, in a manner of a pipe thread.

The outer end of the main body portion 12, that is to say the end remote from the threads 16, is provided with a plurality of, in this case four, separate spaced apart fingers 18, extending axially along the axis of the hose coupling 10. Fingers 18 are shown as having a generally partially cylindrical cross-section, so as to define essentially the outline of a cylindrical tubular structure. Each of the fingers 18 is to a certain degree flexible, and they are formed in this case integrally with the main body 12 out of a single piece of material. Preferably such material will be an injection moulded thermoplastic, but the invention does not exclude any other material from which such hose couplings can conveniently be made. It will be noted that the fingers 18 define an interior bore 20 which is approximately the same diameter as the outside diameter of the hose H, this being considerably greater than the interior diameter of the bore 14 of the main body 12. At the transition between the fingers 18 and the main body 12, a sealing sleeve 22 is formed by the interior surfaces of body 12 which at this point becomes somewhat thicker in a gradually inwardly tapering manner smaller than the outside diameter of hose H, and terminates at shoulder 23.

This gradual taper, at the transition between the fingers and the main body, provides a tapered sealing sleeve into which the end of the hose H can be forced during assembly. In this way, the sleeve 22 achieves a squeezing or pinching effect upon the outside surfaces of the end of hose H, so as to form a good pneumatic or hydraulic seal at this point, without the use of additional sealing means, such as O-rings and the like which were necessary in the past.

Figure 2:
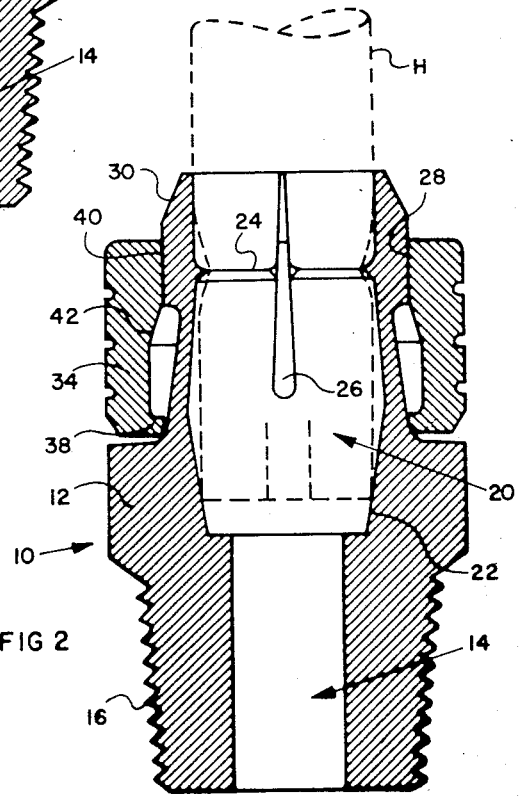
FIG. 2 is a view corresponding to FIG. 1 with the fingers squeezed together.

Within the interior of fingers 18, there are provided inwardly directed tooth members 24, which are relatively sharp edged, and are intended to bite into the outer surface of the hose H, and securely clamp it in position. Such teeth 24 in the embodiment of FIG. 1 are simply in the form of an interior annular ridge coming to a sharp point as shown in FIGS. 1 and 2.

Fingers 18 are separated from one another by axial slots 26 extending from the free ends of fingers 18 downwardly therebetween, and terminating just prior to the sealing sleeve 22. In this way, it is possible for the position, without interfering with one another (as shown in FIG. 2).

The size, shape and number of fingers 18 and their related slots 26, is of course capable of relatively great variation. Thus there may be more or less than four fingers, and they may be curved or arcuate in shape, or flattened in section. Slots 26 may be of various shapes and widths. The only criterion is that fingers 18 should preferably be capable of flexing inwardly so that their related teeth shall grip the hose.

On the exterior of the free ends of each of fingers 18, there is provided a clamping ridge 28, having an outwardly directed angled wedging surface 30 thereon at the free end thereof, and having an inwardly directed collar stop 32 thereon, oppositely directed relative to the surface 30.

In order to provide a squeezing action on the fingers, there is provided a sliding clamping collar 34, which is an annular member formed separately from the fingers 18. Collar 34 is provided with an enlarged annular interior recess 36, shaped so as to receive and conform to the shape of the ridge 28 on the fingers 18.

An inwardly directed annular retaining ring 38 on collar 34 engages with the collar stop 32, to prevent the collar 34 from being slid off the fingers 18, once it has been initially assembled. Ring 38 has an inwardly directed angled surface 39.

At the outwardly directed end of collar 34, there is a reduced diameter clamping ring portion 40 provided, and a tapering cam or wedging surface 42 extends between the reduced diameter clamping portion 40, and the enlarged annular recess 36. Preferably, in accordance with the invention, the tapering surface 42 is angled at essentially the same angle as the wedging surface 30 on ridge 28 on on the fingers 18.

As shown in FIG. 2, when the clamping collar 34 is pushed inwardly, i.e., towards the main body 12, it will cause the cam surface 42 to engage the wedging surfaces 30 on fingers 18, and gradually and progressively squeeze the fingers 18 together. When pushed fully home, the clamping ring 40 will overlie the annular ridge 28, thereby securely holding the fingers 18 in their inwardly squeezed position as shown in FIG. 2.

In this position, the hose H is seen to be nipped by the teeth 24, thereby securely holding it in position.

It is an important feature of the invention that this wedging or clamping action is achieved by an inward movement of the collar 34 relative to the fingers 18.

All that is necessary is for the free end of the hose H to be cut to the desired length, and it is then pushed down the open bore 20 defined by the fingers 18 into the sleeve 22. The hose H is then pushed firmly into the sleeve 22 until the free end engages the hose stop surface 23 thus squeezing it and making a good seal. The collar 34 is then slid inwardly or downwardly along fingers 18, towards main body 12, thereby squeezing fingers 18 tightly around hose H and clamping it firmly in position.

In fact, both the insertion of the hose H and the inward movement of the clamping ring 34 can be carried out with the same hand, since the direction of the clamping movement of the ring 34 is the same direction as the direction of the force being applied to the hose H to hold it firmly clamped in position.

It is thus possible for an operator to first of all thread a number of the main bodies 12 into position in their appropriate valves, or in their connector blocks (not shown), after which the hoses H can then simply be inserted, and clamped in position by movements all of which take place in the same direction.

It is thus possible for the operator to work quickly and effectively in a relatively confined space, without special training.

Initial assembly is made easy by cooperation between wedging surface 30 of ridge 28, and angled surface 39 of ring 38. The collar 34 can thus be simply forced over ridge 28, but cannot readily be removed.

At the same time since there are only two parts to the entire coupling 10, namely the integral main body 12 and fingers 18 constituting one part and the sliding collar 34 constituting the other part, it is not possible for the coupling to become disassembled even during substantial misuse. Flexing of the hose, once inserted, cannot cause separation of the fingers from the main body, since they are of one-piece construction.

Figure 3:
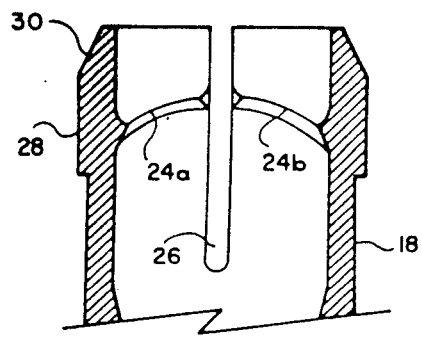
FIG. 3 is a section of an alternate embodiment.
Figure 4:
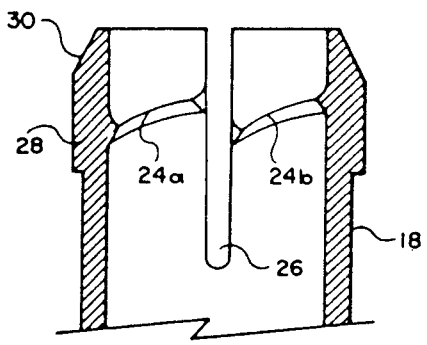
FIG. 4 is a section of a further alternate form.

As shown in FIGS. 3 and 4, the teeth 24 of fingers 18 as shown in FIGS. 1 and 2 may be replaced by diagonally angled teeth 24a, 24b. The angling of such teeth has certain advantages in that it will essentially prevent the hose H from being rotated or twisted. In addition, it will clamp the hose H over a greater length, thereby providing a greater frictional engagement of the hose H.

In accordance with a further feature of the invention, it is also possible to improve the manner of sealing between the male threaded portion 16, and the standard female threaded seating into which it is fastened.

Figure 5:
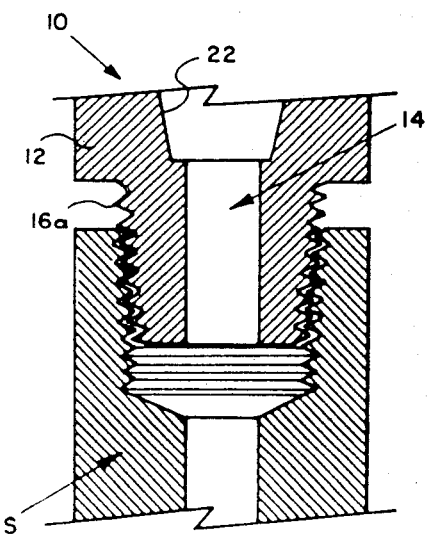
FIG. 5 is a section of another feature of the invention.

As shown in FIG. 5, a typical female threaded socket is shown generally as S. Such a socket S may be formed in a valve or relay or other operating member, or may be part of a connector block, all of these members being well known in the art relating to pneumatic controls or other hydraulic applications, and requiring no further description.

Depending upon the particular design of the system, such sockets S may be threaded with a conventional parallel sided thread, in which case of course the male threads on the hose couplings 10 will also have to correspond and be formed with a male threaded portion 16 having parallel sides so as to fit. In this case, some form of sealant must be provided usually in the form of either a sealing ring or sealing tape, or in some cases a form of glue filler or mastic may be applied.

In many cases the female threads are formed in a tapering manner in the form of a pipe thread. In this case, male threads 16 on the hose coupling 10 are also arranged in a tapered manner in the manner of a pipe thread, so as to match with the tapering threads of the female socket S.

In this case also, even though the threads tighten up much more securely, it is still necessary to provide some form of sealant usually in the form of the conventional plastic sealing tape which is wound around the threads.

In fluidic control systems, such sealants can cause problems. Small particles of sealant escape from the threads and enter the hoses and valves and are a serious source of malfunction.

In order to avoid any of the problems associated with the use of this kind of sealant, or indeed any other sealant, the invention now provides that the male threaded portion shown generally as 16a in FIG. 5, on the main body 12, shall be provided with a taper which is greater than that of the female threaded portion S. In addition, since the material of the main body 12 is usually a thermoplastic material, it is capable of being deformed relatively easily.

The male threaded portion 16 is thus inserted into the female threaded portion S and will be fastened by rotating it no more than two or three times. At this point, the threads will lock solid, and a further slight rotation of the main body 12 will cause complete binding between the male thread and the female thread, and a certain degree of deformation of the thermoplastic male threads 16a will in fact take place. It is found that this achieves a substantially perfect seal at least for the purposes of the type of equipment under consideration, without the use of any extra sealant.

Obviously, if such a structure is overtightened then the threads are destroyed and the hose coupling 10 will have to be replaced.

However, after a little practice, it is possible for an operator to readily determine exactly when a seal has been achieved, and at what point further tightening will cause rupturing of the threads themselves.

In this way, the assembly of the entire structure is made much quicker, with substantial savings in overall costs.

Figure 6:
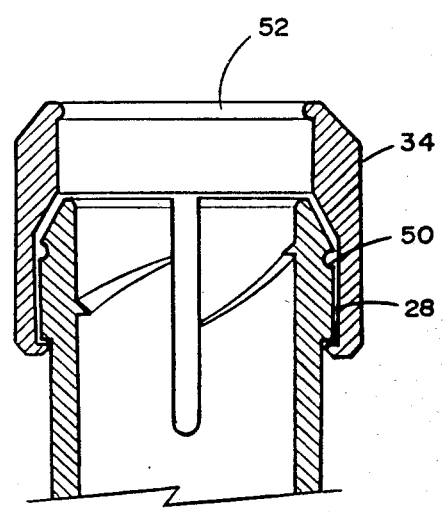
FIG. 6 is a partial section of a further alternate feature of the invention.

As best shown in FIG. 6, an optional feature of the invention provides an interlocking annular ring 50, formed in clamping ridge 28, adjacent the forward end thereof, and a complimentary mating locking rib 52 formed on the interior surface of the collar 34.

The rib 52 will seat in the recess 50 when the collar is pressed home into clamping engagement, and will thereby hold it more or less securely against shaking loose, although it will obviously be capable of being dislodged if sufficient manual pressure is applied.

Figures 7, 8:
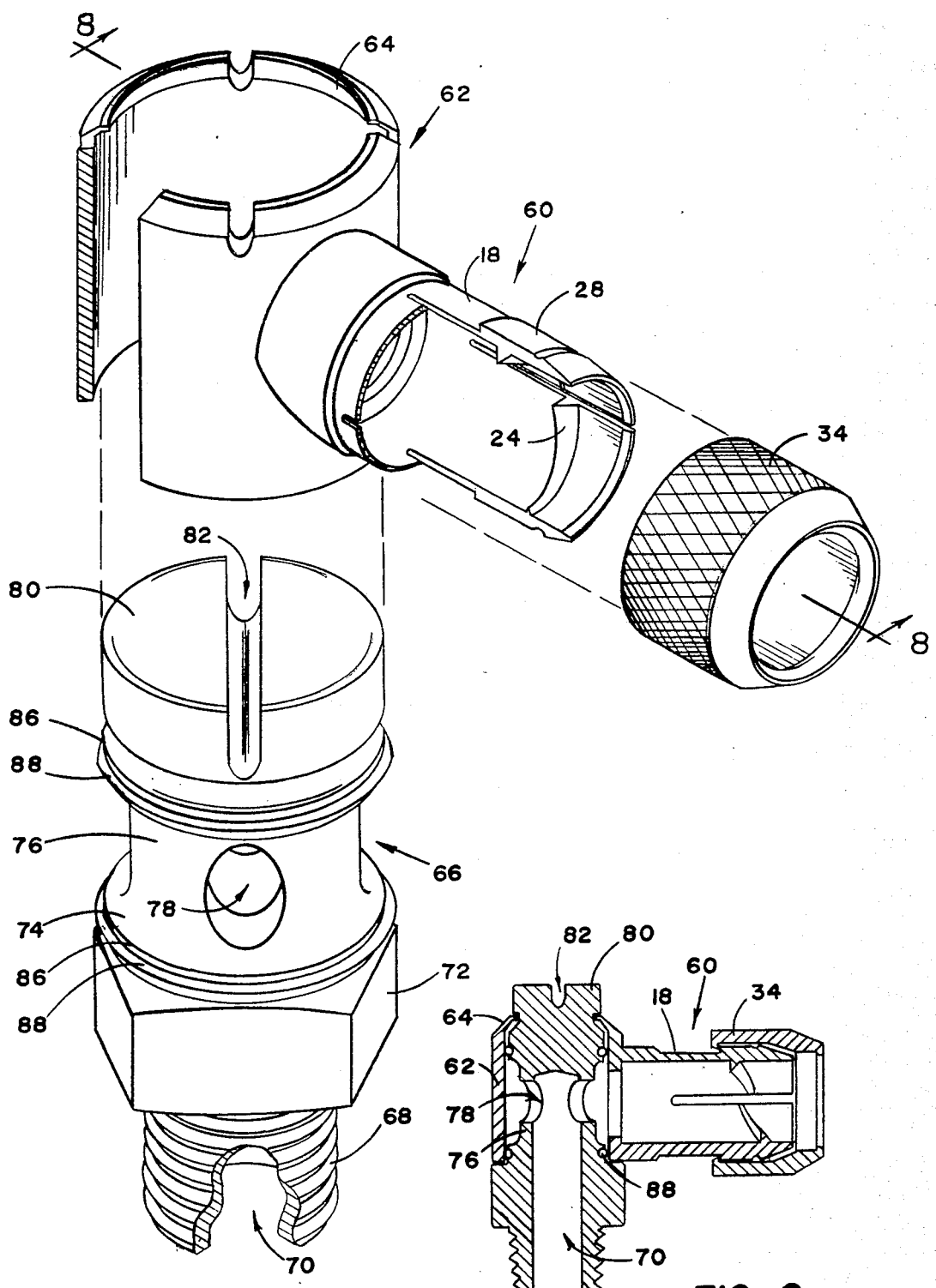
FIG. 7 is an exploded perspective illustration of a rotatable Tee junction in accordance with the invention; and, FIG. 8 is a section along the line 8—8 of FIG. 7.

In many cases, when using such hose couplings it is desirable to provide a Tee junction unit, as best shown in FIGS. 7 and 8.

Such Tee junction units are usually made so that the hose connection portion on one side is rotatable relative to the other for purposes to be described.

Thus the Tee junction unit according to the invention will be seen to comprise a hose connection portion indicated as 60, having clamping fingers 18, a clamping ridge 28, and a clamping sleeve 34 all as shown in connection with FIGS. 1 to 5. Clamping teeth 24, or angled clamping teeth such as 24A and B are located on the inside surface of the fingers 18 in the manner described.

The fingers and sliding collar also have interior sliding wedging surfaces as described above.

The hose connection member 60 is however formed with a generally transverse coupling sleeve of cylindrical shape indicated as 62, which is open at both ends, and communicates with the interior of coupling 60 for passage of fluid.

At an end, designated at the upper end of the cylindrical sleeve 62 there is provided an inturned locking and holding ring 64, and the other end of such sleeve 62 defines a regular cylindrical shape.

The other portion of the Tee junction comprises a rotatable body portion 66. Body portion 66 has a typical tapered threaded portion 68 at one end, and a central bore 70 for communication of fluid.

Hexagonal drive surfaces 72 may be formed on the main body 66 for engagement by a suitable wrench.

A neck portion indicated generally as 74 extends upwardly from main body 66, and is provided with a waisted central region 76, and a transverse through bore 78, communicating with the interior of the sleeve 62.

A drive head portion 80 extends above neck 74 and is provided with a screwdriver slot, or other drive means 82.

An annular locking recess 84 is formed between head 80 and neck 74 for receiving the locking rim 64.

Two spaced apart annular grooves or recesses 86 are provided above and below the waisted portion 76 for receiving typical O-rings 88 therein.

The O-rings 88 bear on the interior surfaces of the sleeves 62 and provide a good effective pressure tight seal above and below the waisted portion 76.

Such Tee junctions are particularly simple to assemble, by simply forcing the head 80 upwardly through the cylindrical sleeve 62. The resilient snap action of the material will permit the head 80 to pass upwardly through the locking rib 64 after which the rib 64 will snap into the groove 84 and lock the head against removal.

The entire neck 74 and body 66 are thus freely rotatable within sleeve 62, while being sealed against the possible loss of fluid or fluid pressure by means of the O-rings 88.

Thus it is possible if necessary to connect a hose into the fingers 18 in a manner described above, after which if necessary, the main body 66 can be fastened in a suitable threaded recess adapted to receive threads 68 simply by rotation of head 80 by means of a screwdriver. Alternatively a wrench can be used to rotate the structure by means of surfaces 72 if desired.

Even during use, the hose connection portion 60 can be swung around the neck 74 even while subjected to working pressures, without disturbing the seal.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A hose coupling for attachment to a hose and comprising;

hose clamping fingers having inner ends rooted to said body portion, and having outer ends from said body portion, the body portion and the fingers being formed as a single integral one piece unit;

ridge means around the exterior of said fingers adjacent said outer ends, said fingers defining a reduced cross-section from said ridge means to said inner ends;

slidable collar means having inner and outer ends fitting captively around said fingers, and being slidable along said fingers relative to said ridge means;

an interior annular wedging portion around the interior of said collar adjacent said outer end for cooperating with said ridge means so as to squeeze said fingers together when the collar means is slid towards said body portion, and releasing said fingers when the collar means is slid away from said body portion;

collar retaining means on the inner end of said collar means for engaging said fingers and retaining said collar means thereon said collar means defining an intermediate portion between said inner end, and said wedging portion, of an enlarged diameter to fit loosely over said ridge means on said fingers;

interior tooth means on said fingers arranged and located so as to engage the outer surface of said hose, and to bite into it, when said fingers are squeezed together by said wedging portions of collar means, and interior sealing sleeve means of gradually reducing diameter for making sealing engagement with the outer surface of said hose.

2. A hose coupling as claimed in claim 1 wherein said tooth means are angled.

3. A hose coupling as claimed in claim 1 including an inwardly directed angled surface on said wedging portion of sid collar means at the transistion from said wedging portion to said intermediate portion for progressively squeezing said ridge means.

4. A hose coupling as claimed in claim 3 including an outwardly directed tapered surface on said ridge means complementary to said inwardly directed angled surface on said wedging portion of said collar means.

5. A hose coupling as claimed in claim 1 including complimentary locking recess and rib formations formed on said collar means and said clamping fingers, whereby to secure the same in clamping relationship, when in their clamping position.

6. A hose coupling as claimed in claim 1 including threaded connection means formed on said body portion.

7. A hose coupling as claimed in claim 1 including a generally cylindrical sleeve portion formed on said body portion communicating with said bore, and a rotatable body member shaped and adapted to be received in such sleeve portion, and locking means for holding same in such position, and sealing means for sealing between such rotatable body member and said cylindrical sleeve portion.

8. A hose coupling as claimed in claim 7 including a locking ridge formed inwardly of said cylindrical portion, and a complimentary locking recess for receiving such ridge, on said body member.

9. A hose coupling as claimed in claim 8 including a neck portion on said body member shaped and adapted to fit within such cylindrical sleeve portion and having a waisted region therearound and a transverse bore therethrough, and including upper and lower O-ring seals mounted on said neck portion above and below such waisted portion.

10. A hose coupling as claimed in claim 9 including threaded fastening means on said body member, and a bore through said body member in communication with such transverse bore.

11. A hose coupling as claimed in claim 9 including a head portion extending above said neck portion outwardly of said cylindrical portion, and drive surfaces formed on said head portion for engagement by tool means.

* * * * *